United States Patent
Rosera et al.

(10) Patent No.: US 7,254,224 B2
(45) Date of Patent: *Aug. 7, 2007

(54) SYSTEM AND METHOD OF TRIGGERING SERVICES FOR CALL CONTROL

(75) Inventors: Martin W. Rosera, San Jose, CA (US); Subir Saha, San Jose, CA (US); Marcelo C. San Martin, Alviso, CA (US); Bill Leslie, Santa Clara, CA (US)

(73) Assignee: LongBoard, Inc., Santa Clara, CA (US)

( * ) Notice: Subject to any disclaimer, the term of this patent is extended or adjusted under 35 U.S.C. 154(b) by 308 days.

This patent is subject to a terminal disclaimer.

(21) Appl. No.: 10/678,478

(22) Filed: Oct. 3, 2003

(65) Prior Publication Data
US 2004/0066925 A1 Apr. 8, 2004

Related U.S. Application Data

(63) Continuation of application No. 10/112,171, filed on Mar. 29, 2002, now Pat. No. 6,671,364.

(51) Int. Cl.
*H04M 3/42* (2006.01)

(52) U.S. Cl. .......................... 379/207.02; 379/221.14; 370/392; 370/400

(58) Field of Classification Search ............ 379/207.02, 379/221.14, 221.01, 221.02; 370/392, 400
See application file for complete search history.

(56) References Cited

U.S. PATENT DOCUMENTS

| | | | | |
|---|---|---|---|---|
| 5,684,800 | A | * 11/1997 | Dobbins et al. | ............ 370/401 |
| 5,946,308 | A | * 8/1999 | Dobbins et al. | ............ 370/392 |
| 6,147,995 | A | * 11/2000 | Dobbins et al. | ............ 370/392 |

* cited by examiner

*Primary Examiner*—Creighton Smith
(74) *Attorney, Agent, or Firm*—Duane Morris LLP

(57) ABSTRACT

A system and method of facilitating server-based call processing services and call control may employ service triggers transported via a standard protocol. A service trigger may enable a service provider to modify or otherwise to customize the behavior of a call processing server arrangement; some or all of the functionality of the call processing server arrangement may be controlled or influenced in accordance with parameters set by the service provider and defined by the service trigger. A service trigger may enable a full range of customization options, ranging from simple modifications to complete service creation and implementation, interrupting and altering call control logic at any point during call control operations.

55 Claims, 5 Drawing Sheets

SYSTEM AND METHOD OF TRIGGERING SERVICES FOR CALL CONTROL

CROSS-REFERENCE TO RELATED APPLICATIONS

The present application is a continuation of U.S. application Ser. No. 10/112,171 filed Mar. 29, 2002 now U.S. Pat. No. 6,671,364, which is related to a co-pending U.S. application Ser. No. 09/891,070, filed Jun. 25, 2001, the entire contents of both of which are incorporated herein by reference.

BACKGROUND

1. Field of the Invention

Aspects of the present invention relate generally to internetworking protocol (IP) telephony, and more particularly to a system and method of facilitating server-based call processing services and call control through use of service triggers transported via a standard protocol.

2. Description of the Related Art

Recent advances in internetworking protocol (IP) data transmission techniques and wireless communications technologies have led to increasing popularity of packet-switched and internet-based telephony and various other call-oriented services. Conventional systems have proposed internet-enabled, or web-enabled, call interfaces which are capable of managing packet-based or IP-based voice and data communications. These systems typically enable IP or web communications services through implementation of a call processing server, i.e. server-side call processing hardware and software operative for call initiation and management.

Conventional server-based call processing methods and hardware platforms are often inadequate to accommodate the volume of communications traffic for which the server is responsible. Moreover, current hardware infrastructures and the software implemented thereon are not sufficiently flexible to allow communications service providers to customize or to modify the functionality and the range of services offered. Specifically, existing limits of the network infrastructure and programming methodologies restrict the service providers with respect to the type, quality, and usability of the services they can offer.

DETAILED DESCRIPTION

Embodiments of the present invention overcome various shortcomings of conventional technology, providing a system and method of facilitating server-based call processing services and call control through use of service triggers transported via a standard protocol.

In some embodiments, a system and method of call control may implement a plurality of computer servers or software modules, each of which may be responsible for a limited range of call processing and call control tasks. A service trigger may enable a service provider to modify or otherwise to customize the behavior of a call processing server arrangement; some or all of the functionality of the call processing server arrangement may be controlled or influenced in accordance with parameters set by the service provider and defined by the service trigger.

As used herein, the term "service creation" generally refers to the functionality of a call control system which enables providers to create and to deliver additional or customized communications services to their respective client bases; such customization may include call forwarding or conferencing, for example, and may be enabled through proprietary software or application program interfaces (APIs). Specifically, service triggers may enable a full range of customization options, ranging from simple modifications to complete service creation and implementation.

The foregoing and other aspects of the various embodiments of the present invention will be apparent through examination of the following detailed description thereof in conjunction with the accompanying drawings.

Figure 1:
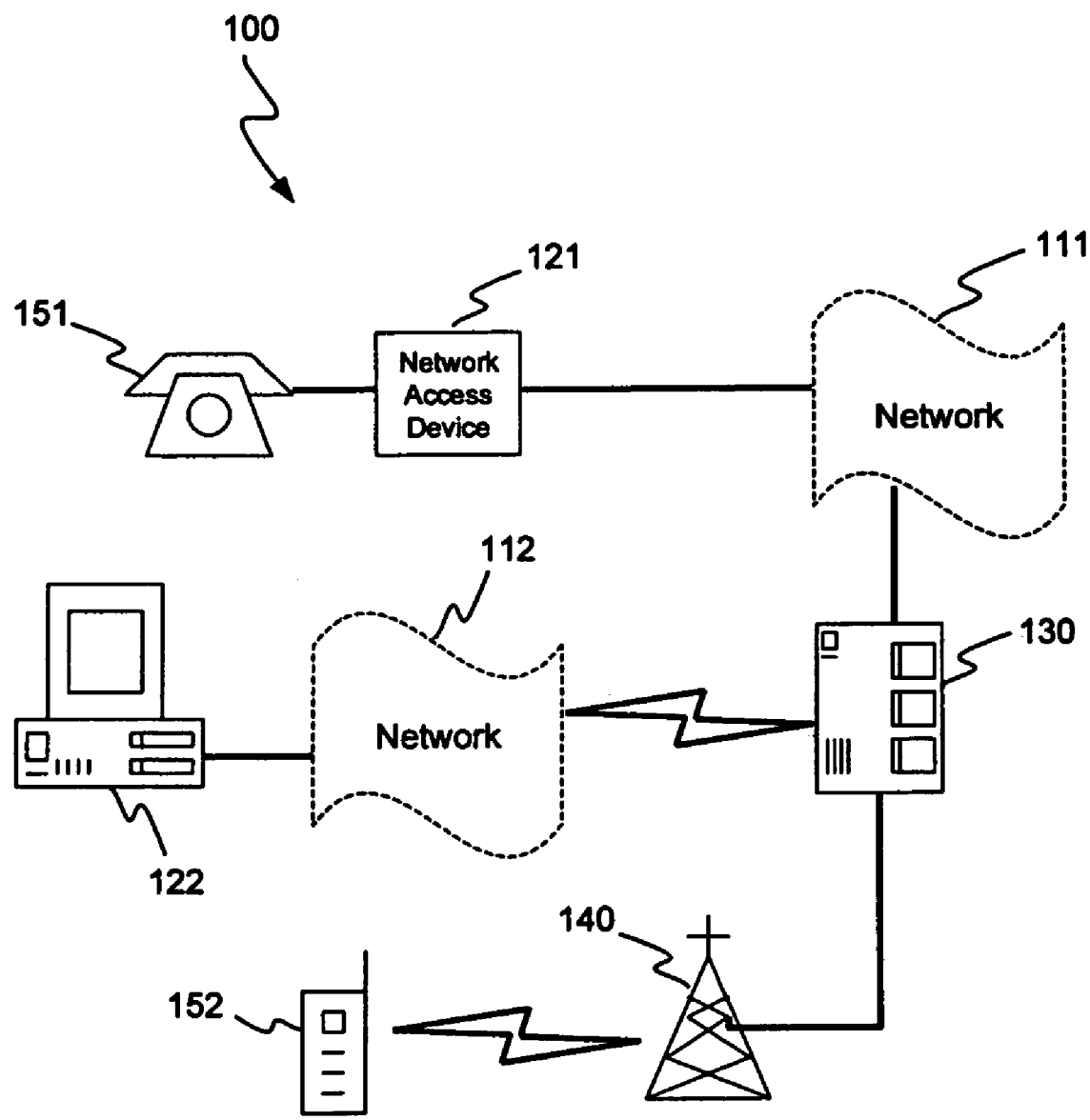
FIG. 1 is a simplified block diagram illustrating a data communication network environment in which embodiments of a system and method of call control may be employed.

Turning now to the drawings, FIG. 1 is a simplified block diagram illustrating a data communication network environment in which embodiments of a system and method of call control may be employed. A communication network 100 may be configured to facilitate packet-switched data transmission of text, audio, video, Voice over IP (VoIP), multimedia, and other data formats known in the art. Network 100 may operate in accordance with various networking protocols, such as Transmission Control Protocol (TCP), Internetworking Protocol (IP), Hypertext Transfer Protocol (HTTP), Simple Mail Transfer Protocol (SMTP), Asynchronous Transfer Mode (ATM), Real-time Transport Protocol (RTP), Real-time Streaming Protocol (RTSP), Session Announcement Protocol (SAP), Session Description Protocol (SDP), and Session Initiation Protocol (SIP). A method and system of call control may be employed in conjunction with numerous other protocols known in the art or developed and operative in accordance with known principles.

Network access devices 121 and 122 may be connected via one or more communications networks 111 and 112 enabling two-way point-to-point, point-to-multipoint, or multipoint-to-multipoint data transfer between and, among network access devices 121, 122. Additionally, network access devices 121, 122 may be coupled with peripheral devices such as, inter alia, a telephone 151 or wireless telephone 152. Network access devices 121, 122 and any attendant peripheral devices may be coupled via one or more networks 111, 112 as illustrated in FIG. 1.

In some embodiments, for instance, network access devices 121, 122 may be personal desktop or laptop computers, workstations, personal digital assistants (PDAs), personal communications systems (PCSs), wireless telephones, or other network-enabled devices. The scope of the present disclosure is not limited by the form or constitution of network access devices 121, 122; any apparatus known in the art which is capable of data communication on networks 111, 112 is within the scope and contemplation of the inventive system and method.

Each individual network 111, 112 may also include other networkable devices known in the art in addition to telephony infrastructure, such as telephone network server 130 and wireless telephone base station 140. It is well understood in the art that any number or variety of computer networkable devices or components may be coupled to networks 111, 112 without inventive faculty. Examples of other devices include, but are not limited to, the following: servers; computers; workstations; terminals; input devices; output devices; printers; plotters; routers; bridges; cameras; sensors; or any other networkable device known in the art.

Networks 111 and 112 may be any communication network known in the art, including the Internet, a local area network (LAN), a wide area network (WAN), a virtual private network (VPN), or any similarly operating system linking network access devices 121, 122 and similarly capable equipment. Further, networks 111 and 112 may be configured in accordance with any topology known in the art such as, for example, star, ring, bus, or any combination thereof.

Telephone network server 130 may be configured to allow two-way data communication between different networks, such as networks 111 and 112 as depicted in FIG. 1. Additionally or alternatively, telephone network server 130 may communicate with a private branch exchange (PBX), packet-switched telephone network (PSTN), plain old telephone service (POTS) network, Integrated Services Digital Network (ISDN), or any other telephone network. As illustrated in FIG. 1, telephone network server 130 may be coupled to wireless base station 140 supporting two-way communication between telephone network server 130 and wireless telephone 152.

Figure 2:
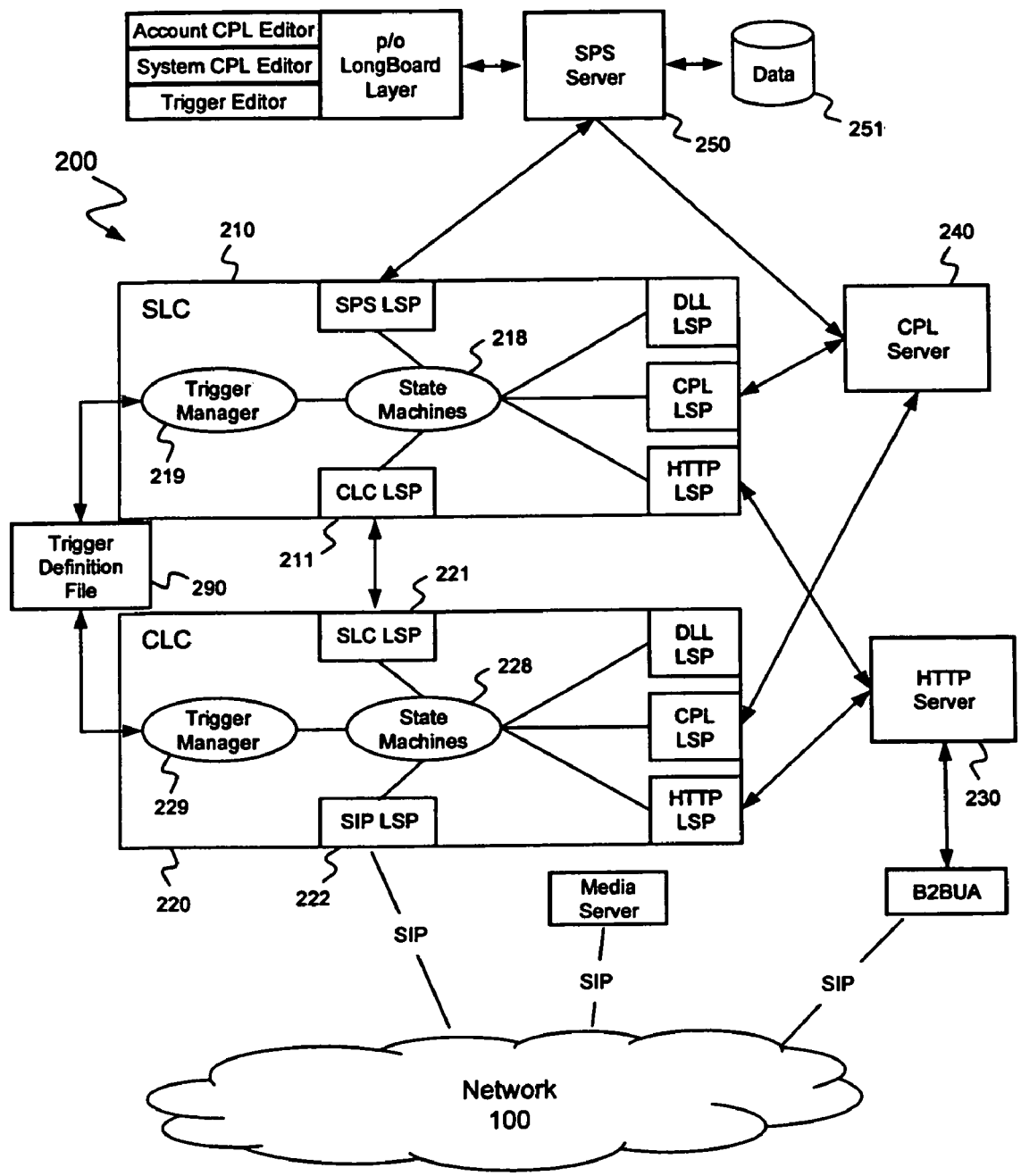
FIG. 2 is a simplified block diagram illustrating one embodiment of a computer server arrangement implementing a call control service trigger strategy.

FIG. 2 is a simplified block diagram illustrating one embodiment of a computer server arrangement implementing a call control service trigger strategy. By way of definition, the term "call," as used herein, may refer to audio transmissions (e.g. radio broadcast or telephone signals), video data, text-based services (e.g. "instant text messaging" or "short message service"), multimedia-based messages, or any other packet-based data communication known in the art.

Calls may be any real-time or near-real-time audio, video, text, or multimedia-based message transmissions across a computer network (i.e. an "on-line" message transmission). Examples of such transmissions include, but are not limited to, user-to-user or user-to-multiuser communications involving electronic conveyance of one or more digital messages such as data packets. Accordingly, examples of calls may include the following: electronic text "chat" or "talk" messaging; electronic-mail (e-mail); instant text messaging; video conferencing sessions; and internet or other IP-based telephony communications which may employ VoIP technology. The foregoing list of call types is not intended to be exhaustive, and is provided by way of example only.

In accordance with the exemplary FIG. 2 embodiment, a system and method of call control may generally employ trigger services as set forth in more detail below. A component infrastructure supporting trigger services may be implemented as a distributed computer server arrangement 200 generally comprising, for example, a Service Logic Control (SLC) server 210 and a Connection Logic Control (CLC) server 220. Additionally, server arrangement 200 may further comprise or have access to an HTTP server 230, a Call Processing Language (CPL) server 240, and a sharepoint portal server (SPS) server 250. In one embodiment, server arrangement 200 may be characterized as a tiered server platform having a "master" server which controls the operation of one or more "slave" servers, as is generally known in the art. Alternatively, server arrangement 200 may be non-tiered, or non-hierarchical; that is, the interaction between and among servers 210-240 may be implemented such that no particular server acts as master governing the operation or functionality of the other servers.

Though the simplified server side of a communications network system is depicted as comprising distributed computer servers (each of which may comprise one or more physical machines embodying one or more microprocessors, memory, storage media, other hardware components, and the like, as is generally known), those of skill in the art will appreciate that server arrangement 200 may comprise as few as one individual computer server. By way of example, in an alternative embodiment, SLC server 210 and CLC server 220 illustrated in FIG. 2 may be implemented as independent, dedicated software modules or firmware encoded on computer readable media, or as hardware instruction sets residing, for example, on a single physical machine such as telephone network server 130 illustrated and described above with reference to FIG. 1. Similarly, HTTP server 230, CPL server 240, and SPS server 250, as well as their respective functionalities described below, may also be incorporated or integrated into a multipurpose physical machine embodying SLC server 210 and CLC server 220. For simplicity, the FIG. 2 embodiment is discussed herein primarily with reference to dedicated servers, but the present disclosure is not intended to be interpreted as being so limited.

As noted briefly above, server arrangement 200 may be configured and operative to process calls based on one or more protocols, such as SIP, for example. Server arrangement 200 may be scalable to provide call processing services for a large number of subscribers, some or all of which may be service providers having independent subscriber bases. In operation, server arrangement 200 may receive a SIP request (e.g. from a device coupled to network 100), validate that request as either TO or FROM an existing subscriber, and transmit the request to the intended recipient based upon predetermined or selectively reconfigurable routing intelligence.

In the FIG. 2 embodiment, some of the call processing functionality may be distributed across the SLC server 210 and the CLC server 220. In some implementations, CLC server 220 may manage communication requirements and administration as specified by the SIP protocol, whereas SLC server 210 may make routing decisions for incoming requests. Accordingly, CLC server 220 may apprise SLC server 210 of incoming requests; SLC server 210 may then provide routing information to CLC server 220.

It will be appreciated that the foregoing communication between SLC server 210 and CLC server 220 may be facilitated by appropriate hardware and software interface mechanisms, such as local service points (LSPs) 211 and 221, respectively. Similarly, SLC server 210 and CLC server 220 may also employ respective LSPs enabling bidirectional data communication with CPL server 240, HTTP server 230, and DLL (dynamic link library) services (not shown); in the FIG. 2 embodiment, SLC server 210 additionally includes an LSP enabling data communication with SPS server 250, and CLC server 220 additionally includes a SIP LSP 222 enabling data communication with a SIP compliant device via network 100.

As described in more detail below, the term "service trigger," as used herein, generally refers to one or more proprietary software instruction sets or API paradigms, for example, which enable additional or modified call processing services to be created and delivered (ie. served) through a defined "actions" set and one or more event handlers. In some embodiments, service trigger functionality may be incorporated in an API serving as a front-end to the functional aspects of server arrangement 200.

Server arrangement 200 may be configured to facilitate a call control strategy implementing service triggers; in that regard, SLC 210 and CLC 220 may generally comprise trigger managers (designated by reference numerals 219 and 229, respectively) communicatively coupled with a trigger definition file 290. Trigger managers 219, 229 may be embodied in software or firmware instruction sets, for example, encoded on computer readable media residing on or accessible by SLC server 210 and CLC server 220, respectively. Similarly, trigger definition file 290 may generally be embodied in a database or other similar data storage structure encoded on computer readable media; as indicated in the FIG. 2 embodiment, trigger definition file 290, irrespective of location, may be accessible by both trigger manager 219 and trigger manager 229. Alternatively, each of servers SLC 210 and CLC 220 may maintain an independent trigger definition file.

In operation, state machines 218 and 228 (respectively resident at SLC server 210 and CLC server 220) generally run call processing tasks as required to initiate, manage, and control communication services governed by server arrangement 200. State machines 218 and 228 may be enabled selectively to communicate with trigger managers 219 and 229, respectively. As set forth in more detail below, trigger managers 219, 229 may identify actions or other processing events associated with one or more service triggers defined in trigger definition file 290, and may invoke the appropriate service trigger accordingly.

Service triggers may generally be configured to interrupt call processing tasks at one or both of SLC server 210 and CLC server 220; in that regard, service triggers may invoke call processing tasks at different components illustrated in FIG. 2 such as HTTP server 230. In the foregoing manner, service triggers may enable server arrangement 200 to provide customized or proprietary services (beyond the capabilities of SLC server 210 and CLC server 220 standing alone, for example), selectively executing various processing tasks in lieu of default or standard call processing offered by the combination of SLC server 210 and CLC server 220. Outsourced call processing tasks executed, for example, at HTTP server 230, may substantially increase the flexibility, load handling characteristics, and overall utility of server arrangement 200.

Figure 3A:
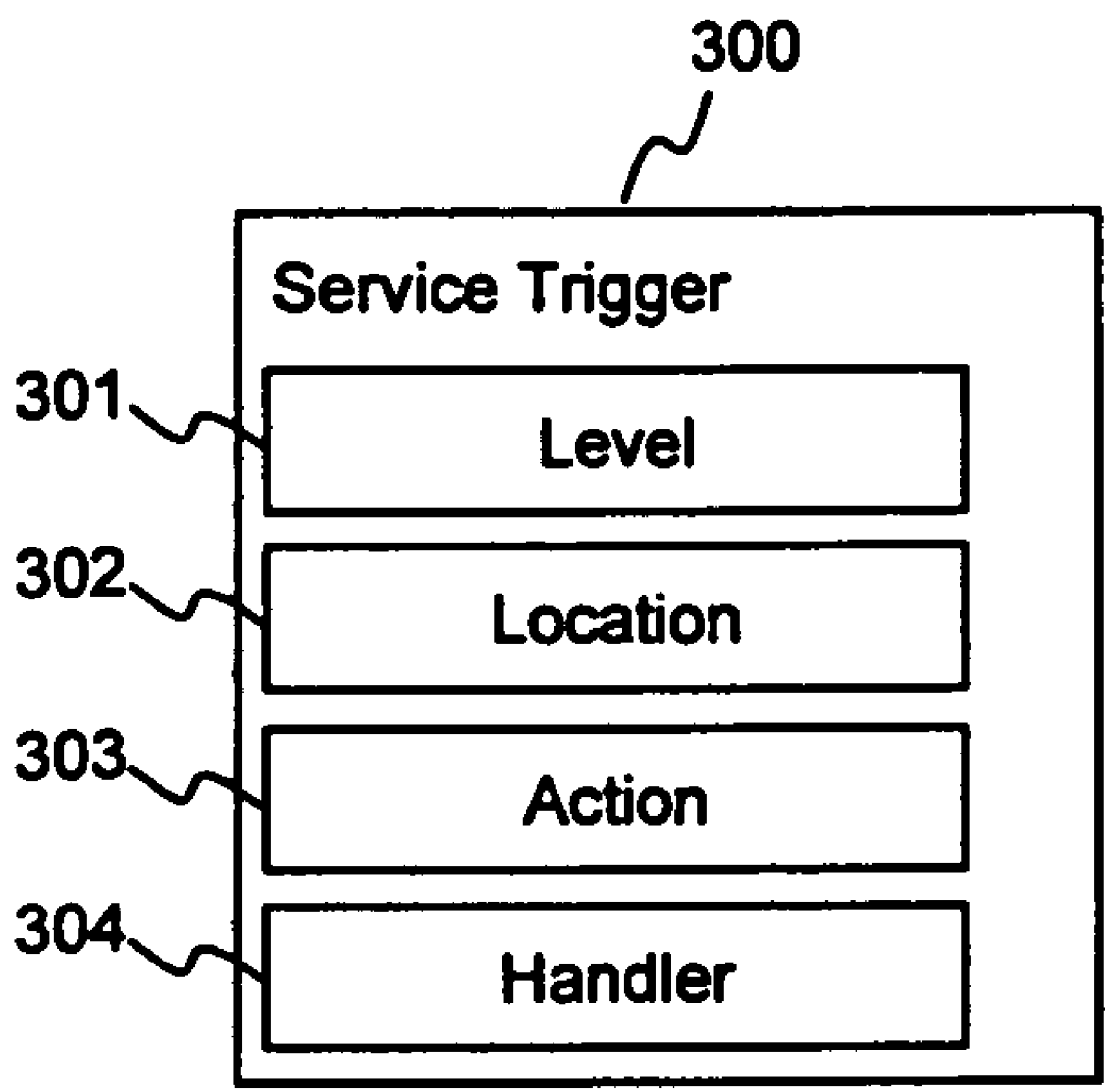
FIG. 3A is a simplified block diagram illustrating the general attributes of one embodiment of a service trigger.

FIG. 3A is a simplified block diagram illustrating the general attributes of one embodiment of a service trigger. In operation, a service trigger 300 may allow a service provider to define some or all of the functionality of a call control server arrangement such as illustrated in FIG. 2. In that regard, service trigger 300 may generally be embodied in a small applet or section of computer readable instruction code maintained or encoded on computer readable media; the instructions or programming code embodying trigger 300 may generally be operative to alter or to modify default behaviors of SLC server 210 or CLC server 220 at predetermined or selectively programmed points, i.e. locations, during call processing operations. In conjunction with service trigger 300, an event handler (not shown in FIG. 3A) may direct subsequent call processing based upon call related data and other information supplied by an interface, such as an API.

As indicated in FIG. 3A, service trigger 300 may generally include level 301, location 302, action 303, and handler 304 attributes. Attributes 301-304 may define functional aspects and operational characteristics of service trigger 300 which, in turn, may facilitate service modification and service creation across a wide range of complexity levels in a call processing server arrangement.

Level attribute 301 may provide information related to the overall scope of operation for service trigger 300 relative to the call control system in which it is employed; accordingly, level attribute 301 may alternatively set service trigger 300 to function on a system-wide, per-enterprise, or per-account basis. With respect to a system-wide trigger level attribute 301, a system-wide trigger description file or database record, for example, may be maintained at every proxy server node (such as CLC 220 in FIG. 2, for instance) in a communications network; such a system-wide trigger description may be available to every client receiving services through a call processing server arrangement 200 such as illustrated and described above with reference to FIG. 2. With respect to trigger level attribute 301 settings for per-enterprise or per-account, services offered to individual companies or accounts may be customized through individualized or unique trigger definition files (such as designated by reference numeral 290 in FIG. 2, for example) or other database records.

Action attribute 303 may define an event or action responsive to which trigger 300 may be invoked. It will be appreciated that some actions may be predefined or follow as a necessary consequence of another attribute, for example. When service trigger 300 is placed at an individual service feature (i.e. location attribute 302 is set at a specified feature as described below), for instance, action attribute 303 may be set by default to recognize an event associated with the feature or service at which trigger 300 is located and to respond accordingly. In some embodiments, action attribute 303 may be set to identify and to respond to SIP FROM, TO, or URI fields matching a configured pattern, for example; service trigger 300 may be activated upon receipt or identification of a packet having the appropriate field information. In this example, location attribute 302 may be predefined in accordance with the ordinary location of the action or event defined by action attribute 303. Additionally or alternatively, action attribute 303 may be set to be responsive to a particular date and time; in such an embodiment, action attribute 303 may activate service trigger 300 at a predetermined or selected date or time. Different or additional configurations suitable for action attribute 303 may depend upon overall system requirements and capabilities, and are within the scope and contemplation of the present disclosure.

Location attribute 302 may provide information related to the location within the server arrangement (e.g. at SLC server 210 or CLC server 220, or at various stages of call processing therein) at which service trigger 300 is invoked. Handler attribute 304 generally represents a mechanism of invoking a trigger handler which, in turn, may execute appropriate software instructions responsive to service trigger 300.

Figure 3B:
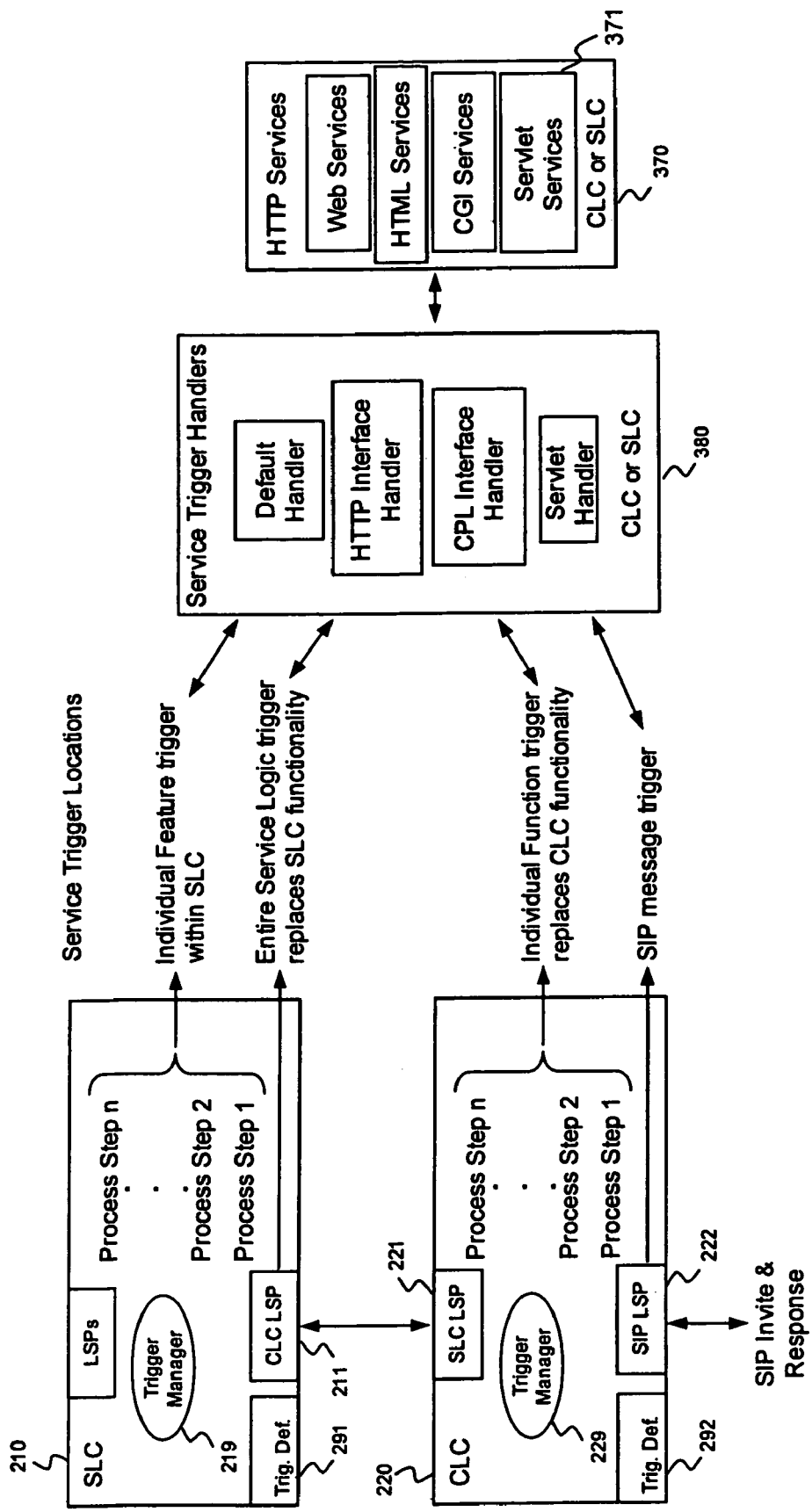
FIG. 3B is a simplified block diagram illustrating the operational characteristics of the location and handler attributes of one embodiment of a service trigger.

FIG. 3B is a simplified block diagram illustrating the operational characteristics of the location and handler attributes of one embodiment of a service trigger. FIG. 3B illustrates the flexibility afforded by service trigger implementation in a call processing server arrangement.

As noted generally above with reference to FIG. 2, CLC server 220 may be configured to receive a SIP (or other protocol) request from a device coupled to a network, validate that request as either TO or FROM an existing subscriber, and transmit the request to the intended recipient based upon predetermined or selectively reconfigurable routing intelligence provided by SLC server 210. Call processing operations (call process steps 1, 2, . . . n, in FIG. 3B) may be executed by state machines 218 and 228, subject to interruption or alteration by trigger managers 219 and 229. In the FIG. 3B embodiment, trigger manager 219 at SLC server 210 may have access to an independent trigger definition file 291, whereas trigger manager 229 at CLC server 220 may have access-to another independent trigger definition file 292. It will be appreciated that trigger definition files 291, 292 may include similar or identical trigger definitions; alternatively, each trigger definition file 291, 292 may maintain unique trigger definitions specific to the respective operational requirements or functional characteristics of SLC server 210 and CLC server 220.

CLC server 220 may manage communication requirements and administration as specified by the protocol employed by network 100 (SIP in FIG. 3B). Where the location attribute of a service trigger is set to invoke the trigger at SIP LSP 222, for example, every SIP transaction may be affected by activation of the trigger; in accordance with some embodiments utilizing a trigger location attribute set to activate a trigger at the SIP message location, SIP servlets 371, for instance, may be instantiated for each SIP transaction, i.e. identification of SIP compliant packets at SIP LSP 222 may trigger one or more transaction-wide SIP servlets. In some embodiments, for example, an entire SIP transaction may be transferred to a particular uniform resource locator (URL), in accordance with the service trigger, for suitable processing by servlet services 371. As noted above, the foregoing functionality may be enabled or facilitated by trigger manager 229, which may recognize a SIP transaction at SIP LSP 222, consult trigger definition file 292, and invoke the appropriate service trigger as a function of the nature and characteristics of the transaction relative to records maintained in trigger definition file 292.

Alternatively, where an entire SIP transaction is not to be affected by customized service creation, a trigger location attribute may be configured to modify or to replace individual functions or features ordinarily offered by CLC server 220. As indicated in the FIG. 3B diagram, a trigger location attribute may be set to activate or to invoke a trigger at one or more individual process steps (1, 2, . . . n), or any selected combination thereof. Accordingly, some or all of the functionality of CLC server 220 may be altered or modified as desired through selective invocation of service triggers under control of trigger manager 229 in conjunction with trigger definition file 292. In that regard, various HTTP services 370 may employ software and hardware resident on an integrated or accessible server (such as HTTP server 230 illustrated in FIG. 2), replacing or augmenting default call processing operations executed at CLC 220.

SLC server 210 may make routing decisions and generally execute various levels of service logic for incoming requests. During ordinary operation of a call control server arrangement, transactions may be passed from CLC 220 to SLC 210 for routing and service control processing as generally described above; similarly, where no service triggers located in CLC 220 otherwise redirect processing, SIP or other call transactions may be passed to SLC server 210 for appropriate handling.

Where the location attribute is set to invoke a service trigger in SLC 210 at CLC LSP 211, for example, every SIP compliant packet reaching SLC 210 may trigger one or more transaction-wide SIP servlets. Accordingly, an SLC service trigger located at CLC LSP 211 may redirect or transfer an entire SIP transaction to a particular URL for suitable processing by servlet services 371; in such instances, the functionality of SLC server 210 may be replaced entirely by services and call processing operations provided by servlets 371. As noted above, trigger manager 219 may recognize a SIP transaction at CLC LSP 211, consult trigger definition file 291, and invoke the appropriate service trigger as a function of the nature and characteristics of the transaction relative to records maintained in trigger definition file 291.

Alternatively, as indicated in the FIG. 3B diagram, a trigger location attribute may be set to activate or to invoke a service trigger at one or more individual process steps (1, 2, . . . n), or any selected combination thereof. In some embodiments, individual features enabled by invoking a call control trigger in SLC 210 may include call forwarding, conferencing, no answer, and the like. Accordingly, some or all of the functionality of SLC server 210 may be altered or modified as desired through selective invocation of service triggers under control of trigger manager 219 in conjunction with trigger definition file 291. In the foregoing manner, various software and hardware components resident on an integrated or accessible server (such as HTTP server 230 illustrated in FIG. 2), may replace or augment default call processing operations executed at SLC 210.

FIG. 3B additionally indicates trigger handlers 380 which may be specified by the handler attribute of a service trigger (illustrated in FIG. 3A, for example). A trigger handler may generally execute appropriate software instructions responsive to activation or invocation of a service trigger. A default handler may implement existing location services logic, i.e. software or firmware instructions already encoded on computer readable media resident at SLC server 210. A CPL handler may implement or invoke a preconfigured CPL script (which may be authored by a service provider, for example, using a suitable API) operative in response to triggering events. Similarly, an HTTP interface handler and a servlet handler may invoke requests to a service provider authored servlet or instruction set through an HTTP LSP.

As noted generally above, the SIP servlet services 371 illustrated in FIG. 3B represent only a subset of services which may be invoked through service trigger call processing strategies. Service triggers of varying complexity may be implemented to extend or otherwise to modify the overall functionality of a call processing server arrangement.

In operation, trigger managers 219, 229, may generate triggers for transmission to service trigger handlers 380 via an appropriate LSP. In some embodiments, trigger messages may be created in accordance with XML (Extensible Markup Language) format, for example, or another suitable file format. A triggered servlet may read and parse the XML and determine an appropriate response as a function of the servlet instruction code. Maximum interoperability between the various system components may be achieved where the trigger message is in a standard format (such as XML) and transmitted in accordance with a standard protocol (such as HTTP); in such an embodiment, a service trigger call processing system may be operating system and hardware independent.

Accordingly, a system and method of facilitating server-based call processing services and call control through use of service triggers transported via a standard protocol may enable a third party (e.g. a telecommunications service provider) to manipulate a call before it is completed; hence, the third party service provider may create unique or customized services to be served to its customer base.

Figure 4:
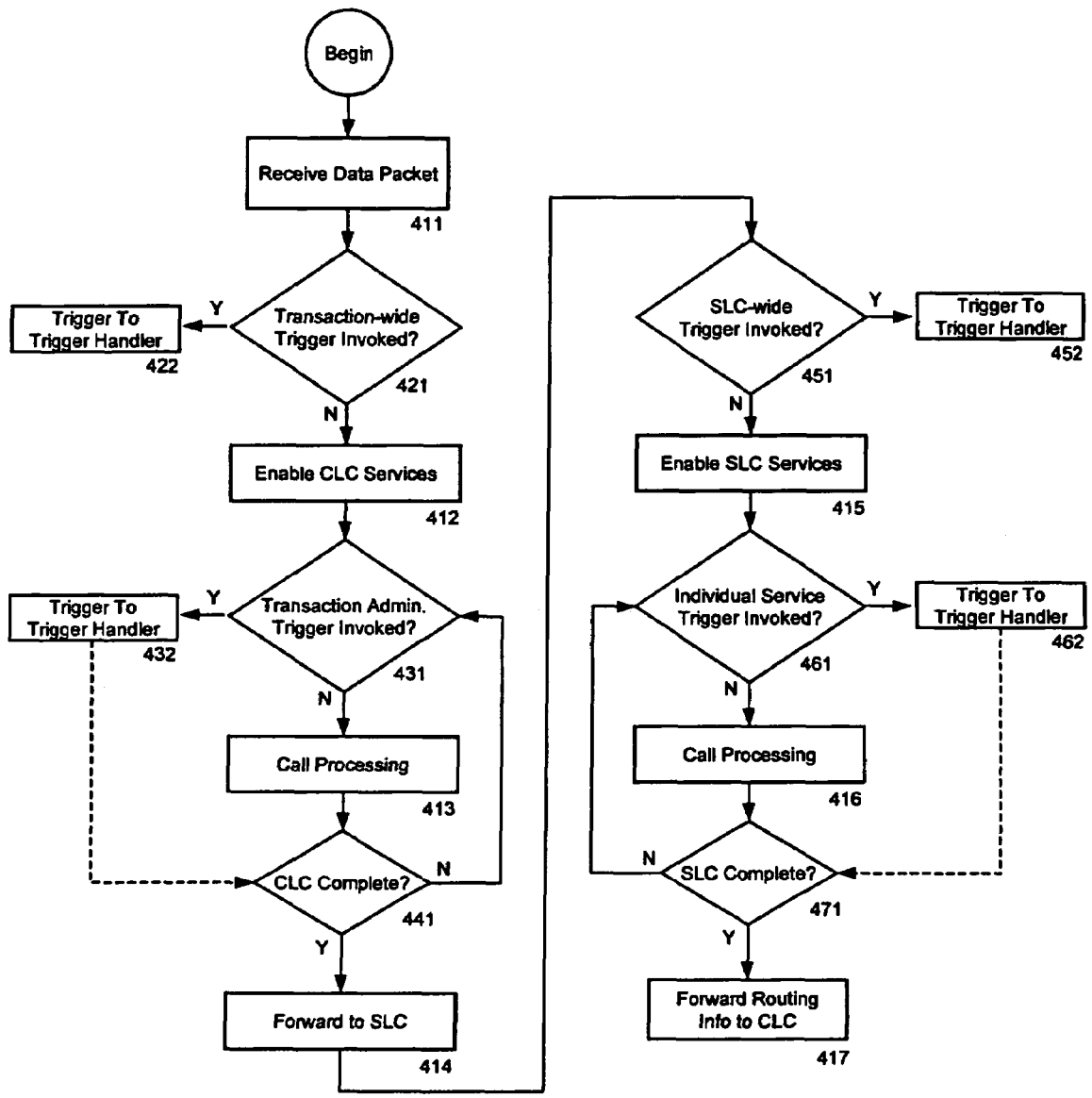
FIG. 4 is a simplified flow diagram illustrating the general operational flow of one embodiment of a call control method employing service triggers.

FIG. 4 is a simplified flow diagram illustrating the general operational flow of one embodiment of a call control method employing service triggers. Initially, a system and method of call processing implementing service triggers may receive a call directed to one or more intended recipients as indicated at block 411; when transmitted across a packet-switched communications network, a call may be received as one or more data packets. In that regard, the FIG. 2 embodiment of a call processing system may include SIP LSP 222 integrated with CLC server 220 or other suitable network interface hardware and software configured and operative to receive data packets (conforming to a particular standard such as SIP, for example) associated with a call.

As set forth above, a service trigger may be selectively invoked responsive to a predetermined call processing event or other occurrence. In the FIG. 4 embodiment, a determination may be made whether a transaction-wide trigger is to be invoked (decision block 421). As described above with reference to FIG. 3B, for example, transactions fresh off the SIP stack may invoke a trigger at SIP LSP 222. A trigger manager may determine that a transaction is being received, consult a trigger definition file, identify a trigger definition associated with the processing event, and invoke the associated trigger accordingly.

In operation, a trigger may cause a system and method of call processing to outsource a selected processing operation in accordance with instructions encoded in the trigger. With reference again to FIG. 3B, for example, a trigger may initiate a service trigger handler 380 which in turn may be operative to invoke selected call processing operations such as HTTP services 370. The terms "outsource" and "outsourcing" in this context generally refer to a process or mechanism of invoking firmware instruction sets or software programming code or scripts encoded in computer readable media; outsourced call processing operations may be customized or modified services which differ from those provided by a connection logic control component (such as CLC server 220) and a service logic control component (such as SLC server 210). Additionally or alternatively, processing operations may be outsourced to control load balancing or throughput in a call processing system.

The foregoing functionality may be activated as indicated at block 422; if a transaction-wide trigger is invoked as determined at decision block 421, the transaction-wide trigger may be formatted and transmitted to an appropriate trigger handler using a standard communication protocol. As noted above, a service trigger file may be formatted in accordance with XML and transmitted using HTTP, for example. Conversely, where a transaction-wide trigger is not invoked at decision block 421, call processing may proceed to enable connection logic control services (block 412).

As set forth in detail above with reference to FIGS. 2 and 3B, protocol-specific processing operations may be executed by a connection logic control component such as CLC server 220, for example. Various communication protocols require or substantially benefit from unique processing operations which are generally executed in accordance with the protocol and the specific transaction or call. A call processing engine, a series of state machines, or other suitable software and hardware associated with a connection logic control component may execute protocol-specific call processing operations under supervision of, or in conjunction with monitoring performed by, a trigger manager as described above.

A trigger manager may identify a processing event or action associated with a trigger (as defined in a service trigger definition file, for example). If a service trigger is invoked (in accordance with a determination at decision block 431), the trigger may be formatted and transmitted to an appropriate trigger handler (block 432) as described above. Further processing may be dictated by instructions encoded in the service trigger, software programming scripts associated with the service created, or some combination thereof. In some embodiments, results of the outsourced processing operation may be returned to the connection logic control component such that processing operations may proceed to decision block 441 as indicated by the dashed arrow in FIG. 4.

If a service trigger is not invoked at decision block 431, the connection logic control component may execute a particular call processing operation as indicated at block 413. As indicated at decision block 441, a method of call processing may loop back to decision block 431 where all processing required by a connection logic component for a particular transaction is not complete. Subsequent call processing operations (block 413) may be completed by the connection logic control component unless interrupted by invocation of a service trigger (decision block 431). Accordingly, invoking a service trigger may include interrupting or preempting a protocol-specific call processing operation which would ordinarily be executed by the connection logic control component; the interrupted or preempted operation may be outsourced to a different component such as an HTTP server, for example, as represented at block 432. In the foregoing manner, a selected call processing feature or operation may be replaced or modified through outsourcing to another component operative to create a selected service responsive to instructions encoded in the service trigger.

If all protocol-specific call processing operations are complete as determined at decision block 441, call control may be forwarded to a service logic control component as represented at block 414.

Operational flow through a service logic control component in a call processing system (right side of FIG. 4) may proceed in a similar manner as operational flow through a connection logic control component (left side of FIG. 4). If a trigger affecting the entire operation of a service logic control component is invoked as determined at decision block 451, the trigger may be formatted and transmitted to an appropriate trigger handler (block 452) using a standard communication protocol as described above; in some embodiments, a service trigger file may be formatted in accordance with XML and transmitted using HTTP.

Where a trigger affecting the entire service logic is not invoked at decision block 451, call processing may proceed to enable service logic control services (block 415). As set forth in detail above with reference to FIGS. 2 and 3B, routing-specific processing operations may be executed by a service logic control component such as SLC server 210, for example. In some embodiments, service logic may be configured to identify one or more intended recipients of a call and to provide routing information associated with the intended recipients to the connection logic. A call processing engine, a series of state machines, or other suitable software and hardware associated with a service logic control component may execute routing-specific call processing operations under supervision of, or in conjunction with monitoring performed by, a trigger manager as described above.

A trigger manager may identify a processing event or action associated with a trigger (as defined in a service trigger definition file, for example). If a service trigger is invoked (in accordance with a determination at decision block 461), the trigger may be formatted and transmitted to an appropriate trigger handler (block 462) as described above. As noted above with reference to connection logic operations, further processing may be dictated by instructions encoded in the service trigger, software programming scripts associated with the service created, or some combination thereof. Results of the outsourced processing operation may be returned to the service logic control component such that processing operations may proceed to decision block 471 as indicated by the dashed arrow in FIG. 4.

If a service trigger is not invoked at decision block 461, the service logic control component may execute a particular call processing operation as indicated at block 416. As indicated at decision block 471, a method of call processing may loop back to decision block 461 where all processing required by the service logic for a particular transaction is not complete. Subsequent call processing operations (block 416) may be completed unless interrupted by invocation of a service trigger (decision block 461). As set forth above, invoking a service trigger may include interrupting or preempting a routing-specific call processing operation which would ordinarily be executed by the service logic control component; the interrupted or preempted operation may be outsourced to a different component such as an HTTP server, for example, as represented at block 462. In the foregoing manner, a selected call processing feature or operation may be replaced or modified through outsourcing to another component operative to create a selected service responsive to instructions encoded in the service trigger.

If all routing-specific call processing operations are complete as determined at decision block 471, routing information, results of service logic processing operations, and other data may be forwarded to the connection logic control component as represented at block 417. Connection logic may complete or manage a call in accordance with routing information provided by service logic.

Several aspects of the present invention have been illustrated and described in detail with reference to particular embodiments by way of example only, and not by way of limitation. Those of skill in the art will appreciate that various modifications to the disclosed embodiments are within the scope and contemplation of the invention. Therefore, it is intended that the invention be considered as limited only by the scope of the appended claims.

What is claimed is:

1. A method of processing a call in a communications network; said method comprising:
   managing at least one of communication requirements and call administration in accordance with a communication protocol;
   executing routing-specific call processing operations in accordance with routing intelligence; and
   selectively outsourcing a call processing operation responsive to a processing event.

2. The method of claim 1 wherein said managing comprises executing protocol-specific call processing operations.

3. The method of claim 1 wherein said executing comprises determining routing information associated with one or more intended recipients of said call.

4. The method of claim 1 wherein said outsourcing comprises interrupting a call processing operation associated with said managing.

5. The method of claim 1 wherein said outsourcing comprises interrupting a routing-specific call processing operation associated with said executing.

6. The method of claim 1 wherein said outsourcing comprises initiating a trigger handler.

7. The method of claim 1 wherein said outsourcing comprises consulting a service trigger definition file associating a service trigger with said processing event.

8. The method of claim 1 wherein said outsourcing comprises enabling selected call processing services.

9. The method of claim 1 wherein said outsourcing comprises transferring a call transaction to a selected uniform resource locator for call processing.

10. The method of claim 1 wherein said outsourcing comprises transferring a service trigger in a standard communication format.

11. The method of claim 10 wherein said service trigger is formatted as an Extensible Markup Language file.

12. A method of processing a call in a communications network; said method comprising:
    receiving a call directed to one or more intended recipients;
    selectively invoking a service trigger responsive to a predetermined call processing event;
    responsive to said invoking, selectively outsourcing a processing operation in accordance with instructions encoded in said service trigger; and
    initiating data communication in accordance with said outsourcing.

13. The method of claim 12 wherein said receiving further comprises executing protocol-specific call processing operations.

14. The method of claim 12 wherein said initiating comprises executing routing-specific call processing operations.

15. The method of claim 14 wherein said initiating further comprises determining routing information associated with said one or more intended recipients.

16. The method of claim 13 wherein said invoking comprises interrupting a selected one of said protocol-specific call processing operations.

17. The method of claim 14 wherein said invoking comprises interrupting a selected one of said routing-specific call processing operations.

18. The method of claim 12 wherein said invoking comprises initiating a trigger handler configured to transmit instructions encoded in said service trigger in a standard communication protocol.

19. The method of claim 12 wherein said invoking comprises consulting a service trigger definition file associating said service trigger with said predetermined call processing event.

20. The method of claim 12 wherein said outsourcing comprises enabling selected call processing services.

21. The method of claim 12 wherein said outsourcing comprises transferring a call transaction to a selected uniform resource locator for call processing.

22. The method of claim 12 wherein said outsourcing comprises transmitting instructions encoded in said service trigger in a standard communication format.

23. The method of claim 12 wherein said service trigger is formatted as an Extensible Markup Language file.

24. The method of claim 12 wherein said initiating comprises receiving results of said processing operation in accordance with a standard communication protocol.

25. A server-based call processing system comprising:
    a connection logic control server configured to execute protocol-specific call processing operations;
    a service logic control server configured to identify one or more intended recipients of a call and to provide routing information associated with said one or more intended recipients to said connection logic control server; and a trigger definition file accessible by a first trigger manager and a second trigger manager; wherein said first trigger manager and said second trigger manager are selectively operative to invoke a service trigger responsive to a selected processing event at said connection logic control server and said service logic control server, respectively, in accordance with data records maintained in said trigger definition file.

26. The system of claim 25 wherein said connection logic control server is operative in accordance with Session Initiation Protocol.

27. The system of claim 25 wherein said service trigger is formatted to be transmitted in a standard communication protocol.

28. The system of claim 27 wherein said service trigger is formatted as an Extensible Markup Language file.

29. The system of claim 25 further comprising a HyperText Transfer Protocol server configured to execute a selected call processing operation responsive to instructions encoded in said service trigger.

30. The system of claim 25 wherein said first trigger manager is selectively operative to interrupt a selected protocol-specific call processing operation and said second trigger manager is selectively operative to interrupt a selected routing-specific call processing operation executed by said service logic control server.

31. The system of claim 25 wherein said connection logic control server comprises a first trigger definition file and said service logic control server comprises a second trigger definition file.

32. The system of claim 25 wherein said connection logic control server and said service logic control server are integrated on a single computer server.

33. The system of claim 29 wherein said connection logic control server, said service logic control server, and said HyperText Transfer Protocol server are integrated on a single computer server.

34. A computer-readable medium encoded with data and computer executable instructions for processing a call; the data and instructions causing an apparatus executing the instructions to:
receive a call directed to one or more intended recipients;
execute at least one of protocol-specific call processing operations and routing-specific call processing operations;
selectively invoke a service trigger responsive to a predetermined call processing event;
selectively outsource a processing operation in accordance with instructions encoded in said service trigger; and
initiate data communication in accordance with results of said processing operation.

35. The computer-readable medium of claim 34 further encoded with data and instructions and further causing an apparatus to:
interrupt a selected one of said protocol-specific call processing operations.

36. The computer-readable medium of claim 34 further encoded with data and instructions and further causing an apparatus to:
interrupt a selected one of said routing-specific call processing operations.

37. The computer-readable medium of claim 34 further encoded with data and instructions and further causing an apparatus to:
initiate a trigger handler operative to transmit instructions encoded in said service trigger in a standard communications protocol.

38. The computer-readable medium of claim 34 further encoded with data and instructions and further causing an apparatus to:
consult a service trigger definition file associating said service trigger with said predetermined call processing event.

39. The computer-readable medium of claim 34 further encoded with data and instructions and further causing an apparatus to:
enable selected call processing services using instructions encoded in said service trigger.

40. The computer-readable medium of claim 34 further encoded with data and instructions and further causing an apparatus to:
transfer a call transaction to a selected uniform resource locator for call processing.

41. The computer-readable medium of claim 34 further encoded with data and instructions and further causing an apparatus to:
format said service trigger as an Extensible Markup Language file.

42. The method of claim 1 further comprising invoking a service trigger responsive to said processing event and wherein said outsourcing is responsive to said invoking.

43. A call processing system comprising:
connection means for executing protocol-specific call processing operations;
service means for executing routing-specific call processing operations; and
trigger manager means for outsourcing a selected call processing operation responsive to a predetermined processing event.

44. The system of claim 43 wherein said connection means comprises a connection logic component operative in accordance with Session Initiation Protocol.

45. The system of claim 44 wherein said service means comprises a service logic component operative to pass routing information to said connection logic component.

46. The system of claim 43 further comprising a service trigger definition file maintaining data records associating said predetermined processing event with a selected service trigger, and wherein said trigger manager means is operative to invoke said selected service trigger responsive to said predetermined processing event.

47. The system of claim 46 wherein said selected service trigger is formatted to be transmitted in a standard communication protocol.

48. The system of claim 47 wherein said selected service trigger is formatted as an Extensible Markup Language file.

49. The system of claim 43 further comprising execution means for executing said selected call processing operation responsive to instructions from said trigger manager means.

50. The system of claim 49 wherein said execution means comprises a HyperText Transfer Protocol server.

51. The system of claim 43 wherein said trigger manager means is associated with said connection means, and further comprising an additional trigger manager means associated with said service means.

52. The system of claim 51 wherein said trigger manager means is selectively operative to interrupt a selected protocol-specific call processing operation and said additional trigger manager means is selectively operative to interrupt a selected routing-specific call processing operation.

53. The system of claim 52 wherein said connection means comprises a first service trigger definition file and said service means comprises a second service trigger definition file.

54. The system of claim 43 wherein said connection means and said service means are integrated on a single computer server.

55. The system of claim 49 wherein said connection means, said service means, and said execution means are integrated on a single computer server.

* * * * *